May 14, 1968  E. J. MOUNT  3,382,768
MOVABLE MILLING MACHINE
Filed Dec. 6, 1965  3 Sheets-Sheet 1

INVENTOR
E. J. MOUNT

ATTORNEYS

3,382,768
MOVABLE MILLING MACHINE
Ernest James Mount, Dorval, Quebec, Canada, assignor to Dominion Bridge Company Limited, Montreal, Quebec, Canada
Filed Dec. 6, 1965, Ser. No. 511,790
8 Claims. (Cl. 90—12)

ABSTRACT OF THE DISCLOSURE

A movable milling machine including a rectangular support frame comprising a pair of side members having tracks along the upper edges thereof. A carriage assembly has an upper carriage portion engageable with the tracks and movable longitudinally therealong and a lower carriage portion attached to the bottom of the upper carriage portion and extending below the horizontal level of the tracks, the lower carriage portion including a saddle plate movable laterally relative thereto, the saddle plate having a motorized milling unit mounted thereon and adapted to be lowered into cutting engagement with a surface to be machined.

---

This invention relates to a milling machine for machining surfaces in fixed locations, and particularly relates to a milling machine which can be easily moved from one fixed location to another.

An example of such a fixed location is a water canal sector gate roller path, which is a steel bed embedded in concrete on the floor of the canal. It is very impractical to remove, for remachining, a steel bed after it has been embedded into a concrete floor and thus it is necessary to machine the steel bed to the required finish and dimensions in place at the canal site.

Conventional milling machines are not capable of being moved from one location to another as they are heavy structures generally fixed to floors of machine shops and require that the work to be milled is brought to the milling machine.

This invention provides a portable milling machine which is capable of machining a surface to a high degree of accuracy, and of being transported to a site and erected over the surface to be machined and then moved to another site when the machining is finished.

In its basic form this invention comprises a rectangular frame unit which is erected over the surface to be machined, and suitably levelled. A carriage is mounted on the frame unit and is adapted for longitudinal and lateral movement thereover. A standard high-speed milling head is mounted on the carriage and can thus be positioned to accurately machine substantially any area of the surface within the confines of the frame unit. Surfaces larger than the frame unit can be machined by relocating the frame unit as required.

It is, therefore, the main object of this invention to provide an improved milling machine which can be moved from one location to another and which is capable of machining surfaces with a degree of accuracy equivalent to that of non-movable milling machines.

Another object is to provide a movable milling machine comprising a rectangular frame unit which can be positioned over the surface to be machined and which includes a milling head movably mounted on the frame unit and adapted to machine substantially any area of the surface within the confines of the frame unit.

Another object is to provide a movable milling machine which can be used to machine a surface of unlimited size, as the milling machine is not restricted by fixed table or bed dimensions.

Another object is to provide a movable milling machine which is adapted for out-door use and can be readily used in adverse weather conditions.

A further object is to provide a movable milling machine which is of simple, robust, and economical construction.

Figure 1:
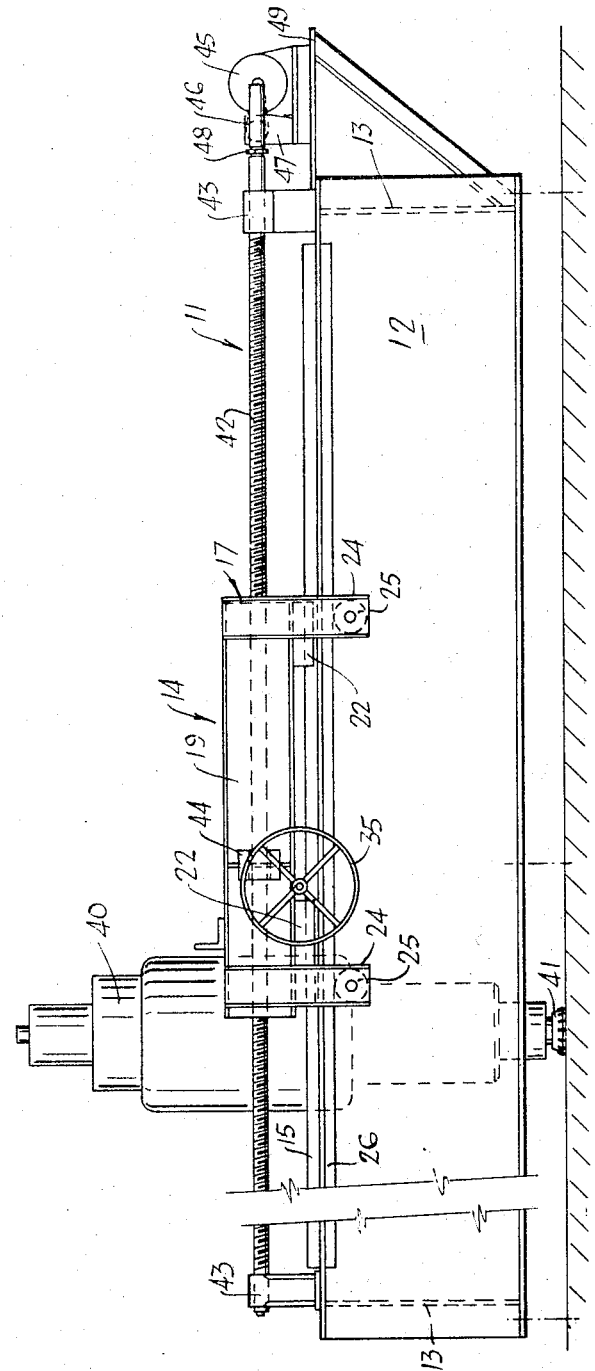
Figure 2:
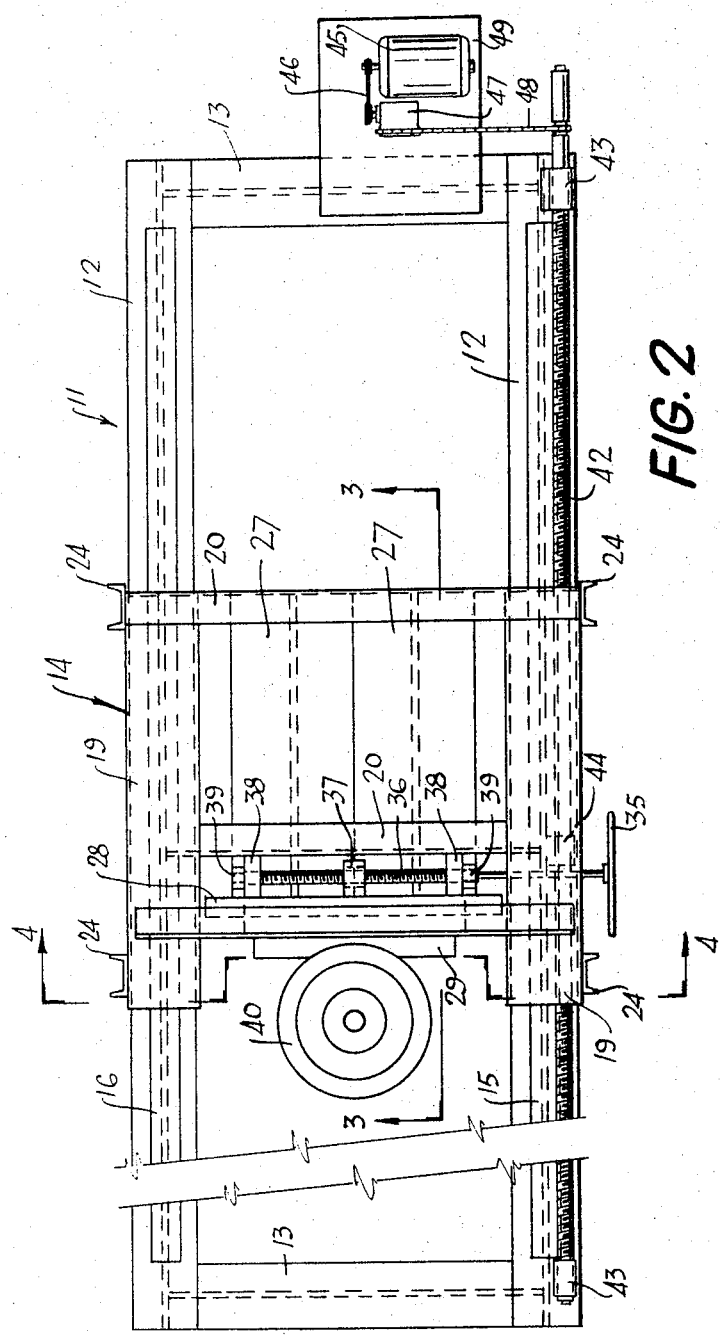
Figure 3:
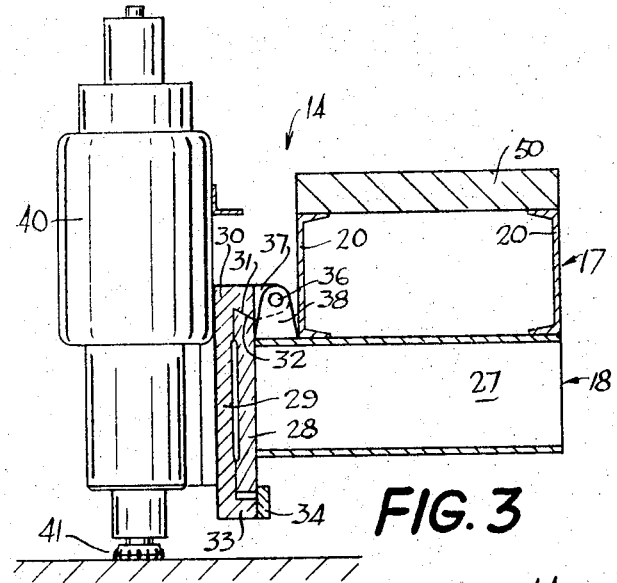
Figure 4:
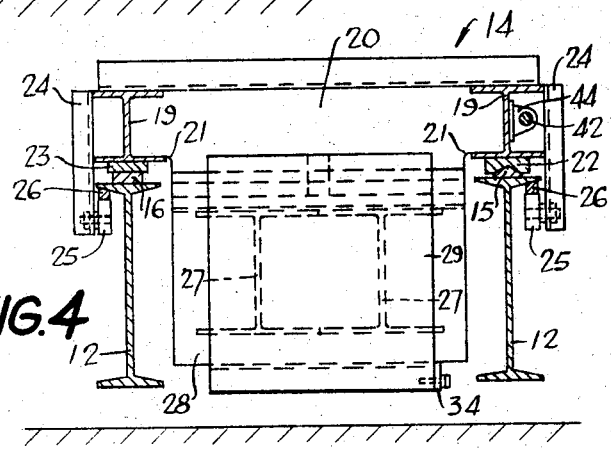
Figure 5:
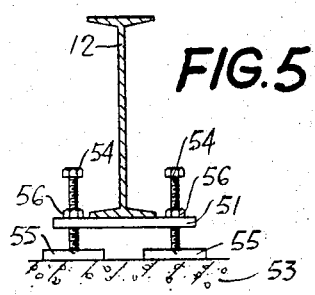
Figure 6:
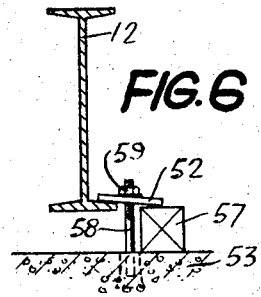

Further objects and advantages of this invention will be apparent by referring to the following detailed specification and figures, in which:

FIG. 1 is a side view of the movable milling machine according to this invention.
FIG. 2 is a plan view on FIG. 1.
FIG. 3 is a section on 3—3 in FIG. 2.
FIG. 4 is a section on 4—4 in FIG. 2.
FIG. 5 is a detail of an arrangement for levelling the frame unit on a surface.
FIG. 6 is a detail of an arrangement for tying down a frame unit to a surface.

Referring now to FIGURES 1–4 frame unit 11 comprises frame side members 12 and frame end members 13 welded or otherwise attached together to form a rigid rectangular structure. Side members 12 and end members 13 are preferably I-beams. A carriage assembly 14 extends laterally across frame unit 11 and is mounted for longitudinal sliding movement along upper track members 15 and 16 attached to the upper surfaces of frame side members 12. Carriage assembly 14 comprises upper carriage 17 and lower carriage 18, welded or otherwise attached together to form a rigid structure.

Upper carriage 17 comprises carriage side members 19 positioned over frame side members 12 and tied together by lateral members 20 rigidly welded thereto. The lower end portions of lateral members 20 are cut away at 21 to clear the upper flanges of frame side members 12.

Carriage shoe members 22 and 23 are attached to the undersides of carriage side members 19 and are adapted to support carriage assembly 14 in sliding engagement with upper track members 15 and 16. Lateral location of carriage assembly 14 relative to frame unit 11 is obtained by the addition of a V-shaped groove in the underside of shoe members 22 and a corresponding V-shaped longitudinal projection on the upper surface track member 15. The adjacent surfaces of shoe members 23 and track member 16 are flat and non-locating.

Carriage roller supports 24 are attached to each end of carriage side members 19 and extend downwardly to a point below the upper flange of frame side members 12. Guide rollers 25 are rotatably mounted inwardly of the lower ends of roller supports 24 and are positioned to roll against the underside machined surfaces of lower track members 26, attached to the outer underside surfaces of the upper flanges of frame side members 12.

Lower carriage 18 comprises longitudinal members 27 rigidly welded or otherwise attached to the lower surfaces of lateral members 20 and a vertical lateral mounting plate 28 rigidly welded or otherwise attached to the forward ends of longitudinal members 27. A saddle plate 29 is slidably mounted for lateral movement on mounting plate 28. The upper portion of saddle plate 29 forms a rearwardly extending ledge 30 which embodies an inwardly and upwardly extending V-groove 31 and slidably engages the chamfered upper edge 32 of mounting plate 28. The lower portion of saddle plate 29 forms a rearwardly extending ledge 33 which extends under mounting plate 28. An adjustable gib plate 34 is attached to the edge of ledge 33 and is adjusted to provide sliding clearance on mounting plate 28. Thus saddle plate 29 is securely and slidably mounted on mounting plate 28 by the combination of V-groove 31 and gib plate 34.

Lateral movement of saddle plate 29 is obtained by rotation of handwheel 35 which is attached to lateral feed screw 36. Feed screw 36 engages in threaded lug 37, attached to saddle plate 29, and is rotatably mounted in lugs 38 attached to longitudinal members 27. Stops 39 are attached to lateral feed screw 36, adjacent the outer faces of lugs 38, and prevent lateral movement of screw 36.

A standard motor driven high-speed milling head 40 is attached to saddle plate 29 and is positioned to bring cutters 41 into engagement with the surface to be machined. Longitudinal sliding movement of carriage 14 along frame side members 12 is achieved by means of longitudinal feed screw 42 which is rotatably mounted in bearing blocks 43 positioned at each end of one frame side member 12 and engages in threaded lug 44 attached to the adjacent carriage side member 19. Longitudinal feed screw 42 is rotated in either direction by reversible electric motor 45 through chain drive 46, reduction gear 47, and chain drive 48. Electric motor 45 is mounted on platform 49, attached to frame end member 13.

Thus operation of electric motor 45 and rotation of handwheel 35 will enable milling head 40 to be positioned to machine substantially any area within the confines of frame unit 11.

Counterweight 50 is positioned on the upper surface of lateral members 20 to provide rigidity against vibrations from the milling cutting operations.

Specific reference to FIGURES 5 and 6 show details of one arrangement for levelling and tying down frame unit 11 onto a surface. In this arrangement frame unit 11 is supported on a plurality of levelling plates 51, and tied down by a plurality of anchor plates 52. The number and positioning of levelling plates 51 and anchor plates 52 will depend upon the dimensions of frame unit 11 and the plane of the surface 53 upon which frame unit 11 is mounted.

Levelling plates 51 are adjusted in a vertical plane by levelling bolts 54 which bear against pads 55 and are locked in adjusted positions by lock-nuts 56.

Anchor plates 52 are adapted to engage the outer lower flanges of frame side members 12 and/or frame end members 13 and to bear downwardly against blocks 57. Anchor bolts 58 are grouted into surface 53 (where applicable) and, through the adjustment of nuts 59, serve to rigidly urge frame unit 11 against levelling plates 51.

It will be understood that the levelling and tying down details described are merely one arrangement for levelling and adjusting frame unit 11 to suit the plane of the surface to be machined and that other arrangements may be adopted to suit varying job or site conditions.

It will also be understood that longitudinal movement of the carriage assembly may be hand-operated or lateral movement of the milling unit may be motorized, as dictated by design and other considerations.

What I claim is:

1. A movable milling machine including a rectangular support frame adapted to be positioned over a surface to be machined and including a pair of longitudinally extending side members, the upper edges of said side members including horizontal, parallel longitudinally extending tracks, a carriage assembly mounted on said support frame and including rigidly connected upper and lower carriage portions, said upper carriage portion extending across said support frame above said tracks and engaging one of said tracks at each of its ends for longitudinal movement along said tracks in a plane parallel to the plane of the surface to be machined, said lower carriage portion located between the said side members and extending downwardly so that a major portion of said lower carriage portion is located below the horizontal level of said longitudinally extending tracks, said lower carriage portion including a mounting plate affixed at one end thereof and extending laterally across said support frame, and a saddle plate mounted on said mounting plate for movement relative thereto in the lateral direction of said support frame, the major portion of said mounting plate and said saddle plate also being located below the horizontal level of said tracks, and a motorized milling unit mounted on said saddle plate and having a milling cutter at the lower end thereof and adapted to be lowered into cutting engagement with the surface to be machined, the combination of said movements permitting said milling head to be positioned for machining any portion of the area within the confines of said support frame.

2. A movable milling machine as set forth in claim 1 in which said tracks include horizontal upper flanges having upper track members positioned on the upper surfaces thereof, and in which shoe members are positioned on the undersides of said upper carriage portion and are adapted to support said carriage in sliding engagement on said upper track members.

3. A movable milling machine as set forth in claim 1 in which said tracks include horizontal upper flanges having lower track members positioned on the lower surfaces thereof, and in which support arms extend downwardly from said upper carriage portion and carry rollers rotatably mounted on the lower ends thereof for engagement with said lower track members.

4. A movable milling machine as set forth in claim 1 including a lateral feed-screw rotatably mounted on said carriage assembly and operably engaging in threaded lug means on said saddle plate, and handwheel means attached to said lateral feed-screw such that rotation of said handwheel will produce said lateral movement of said saddle plate relative to said lower carriage portion.

5. A movable milling machine as set forth in claim 1 including a longitudinal feed-screw rotatably mounted on one of said side frame members and operably engaging in threaded lug means on said carriage assembly and electric motor drive means mounted on said support frame for rotation of said longitudinal feed-screw in either direction to produce longitudinal movement of said carriage assembly relative to said support frame.

6. A movable milling machine as set forth in claim 5 in which one of said upper track members embodies an upwardly extending longitudinal projection and the adjacent shoe members embody corresponding grooves, such that said grooves will engage said projection to provide effective lateral location of said upper carriage portion relative to said support frame.

7. A movable milling machine as set forth in claim 1 including a plurality of levelling plates positioned under said support frame and supported by levelling bolts abutting the surface to be machined, and a plurality of anchor plates engaging said support frame and urged downwardly by anchor bolts attached to said surface, said levelling plates and said anchor plates being spaced around said support frame and adjusted to provide a rigid and level support frame structure relative to said surface.

8. A movable milling machine as set forth in claim 1 including counterweight means positioned on said carriage to provide rigidity against machining vibrations.

References Cited

UNITED STATES PATENTS 3,138,998  6/1964  Ivan _____ 90—12

FOREIGN PATENTS 551,514  2/1943  Great Britain.
1,001,777  8/1965  Great Britain.

LEONIDAS VLACHOS, *Primary Examiner.*